US012313507B2

(12) United States Patent
Ma

(10) Patent No.: US 12,313,507 B2
(45) Date of Patent: May 27, 2025

(54) SOLID TRANSFERRING DEVICE

(71) Applicant: Liang Ma, Fujian (CN)

(72) Inventor: Liang Ma, Fujian (CN)

( * ) Notice: Subject to any disclaimer, the term of this patent is extended or adjusted under 35 U.S.C. 154(b) by 449 days.

(21) Appl. No.: 17/822,297

(22) Filed: Aug. 25, 2022

(65) Prior Publication Data
US 2022/0412847 A1 Dec. 29, 2022

Related U.S. Application Data

(63) Continuation of application No. PCT/CN2021/077869, filed on Feb. 25, 2021.

(30) Foreign Application Priority Data

Feb. 28, 2020 (CN) .......................... 202010129759.5
May 7, 2020 (CN) .......................... 202010376897.3
Jun. 30, 2020 (CN) .......................... 202010612979.3

(51) Int. Cl.
*B01L 3/02* (2006.01)
*G01N 1/08* (2006.01)

(52) U.S. Cl.
CPC .............. *G01N 1/08* (2013.01); *B01L 3/0227* (2013.01); *B01L 2300/0663* (2013.01); *B01L 2300/0672* (2013.01); *B01L 2400/0433* (2013.01)

(58) Field of Classification Search
CPC . G01N 1/08; B01L 3/0227; B01L 2300/0663; B01L 2300/0672; B01L 2400/0433
See application file for complete search history.

(56) References Cited

FOREIGN PATENT DOCUMENTS

| CN | 202270532 | 6/2012 | |
|----|-----------|--------|---|
| CN | 203465109 | 3/2014 | |
| CN | 104359534 A | 2/2015 | |
| CN | 204768784 | 11/2015 | |
| CN | 105324175 A * | 2/2016 | .............. B01L 3/021 |
| CN | 105828949 A * | 8/2016 | .............. B01L 3/021 |
| CN | 206168450 | 5/2017 | |

(Continued)

OTHER PUBLICATIONS

WIPO, International Search Report for PCT/CN2021/077869, May 19, 2021.

(Continued)

*Primary Examiner* — Jill A Warden
*Assistant Examiner* — Michael Stanley Gzybowski
(74) *Attorney, Agent, or Firm* — Hodgson Russ LLP

(57) ABSTRACT

A solid transferring device includes a main body and a lance. The main body comprises a casing, a power system, a weighing system including a weight sensor and a control system. The power system comprises a motor and a transmission shaft having a transmission shaft head for matching a lance transmission head. The lance includes the lance shell, a screw and the lance transmission head, and an upper part of the lance shell has a matching engaging portion for matching the tip portion of the sleeve to allow the main body to catch the lance. The motor is configured to control the transmission shaft to rotate forwardly or reversely, that when the transmission shaft head is inserted into the lance, drives the screw to rotate forwardly or reversely to screw in to take a solid sample or screw out to release the solid sample.

19 Claims, 14 Drawing Sheets

(56) References Cited

FOREIGN PATENT DOCUMENTS

CN 208443822 U 1/2019
CN 111151318 A 5/2020

OTHER PUBLICATIONS

CNIPA, First Office Action for CN Application No. 202010612979. 3, Apr. 28, 2021.
CNIPA, First Office Action for CN Application No. 202010129759. 5, Apr. 21, 2021.

* cited by examiner

SOLID TRANSFERRING DEVICE

CROSS-REFERENCE TO RELATED APPLICATIONS

The present disclosure is a continuation of International Application No. PCT/CN2021/077869 filed on Feb. 25, 2021, which claims priority to Chinese Patent Application No. 202010129759.5 filed on Feb. 28, 2020, No. 202010376897.3 filed on May 7, 2020, and No. 202010612979.3 filed on Jun. 30, 2020. The entire disclosures of the above-identified applications are incorporated herein by reference.

FIELD

The present disclosure relates to a technical field of sampling a solid sample, and more particularly to a solid transferring device.

BACKGROUND

In the fields of chemistry, material, medicine and biology, it is always required to weight, transfer and dispense solid or liquid samples in a laboratory. A liquid transferring device is a hand-held device used in the laboratory for dispensing the liquid. A piston of the liquid transferring device removes a part of the gas through a telescopic motion of a spring to inhale the liquid by the atmospheric pressure, and then pushes the air to discharge the liquid. However, unlike the liquid samples, the solid samples cannot be accurately pipetted by means of the air displacement by the liquid transferring device. A traditional solid weighing method is to take out the solid sample in small portions from a reagent bottle with a medicine spoon and put it onto a weighing paper on an electronic scale. Such a weighting process is time-consuming, labor-intensive and inconvenient, and the samples may scatter, which may contaminate an operating table.

Thus, in order to improve the work efficiency of the laboratory, there is still a need to develop a portable solid transferring device with good reliability, simple operation, and accurate and fast weighing.

SUMMARY

A solid transferring device includes a main body and a lance. The main body includes a casing, a power system, a weighing system and a control system. The casing is provided with an internal cavity that penetrates through the casing in an up and down direction and is configured to accommodate the power system and the weighing system. The power system includes a driving mechanism and a transmission shaft. The driving mechanism is mounted in the casing and has an output end downwardly connected to the transmission shaft. The transmission shaft has a lower end that emerges from the casing and has a transmission shaft head for matching a lance transmission head. The weighing system includes a weighing sensor mounted in the casing and a sleeve fitted over an outer periphery of the transmission shaft. An upper end of the sleeve has a flange pressed on the weighing sensor, and a lower end of the sleeve emerges from the casing and has a tip portion for matching a lance shell. The lance includes the lance shell, a screw and the lance transmission head. The lance shell is provided with a lance cavity that penetrates through the lance shell in the up and down direction. An upper part of the lance shell has a matching engaging portion for matching the tip portion of the sleeve to allow the main body to catch the lance where the tip portion is inserted into the matching engaging portion. The screw and the lance transmission head are located in the lance cavity. A lower part of the lance transmission head is fixedly connected to an upper end of the screw to drive the screw to rotate around a center axis of the lance. An upper part of the lance transmission head has a matching transmission portion for matching the transmission shaft head to allow the screw to rotate as the transmission shaft rotates. The driving mechanism comprises a motor configured to control the transmission shaft to rotate forwardly or reversely, that when the transmission shaft head is inserted into the matching transmission portion, drives the screw to rotate forwardly or reversely to screw in to take a solid sample or screw out to release the solid sample.

REFERENCE NUMERALS

Figure 1:
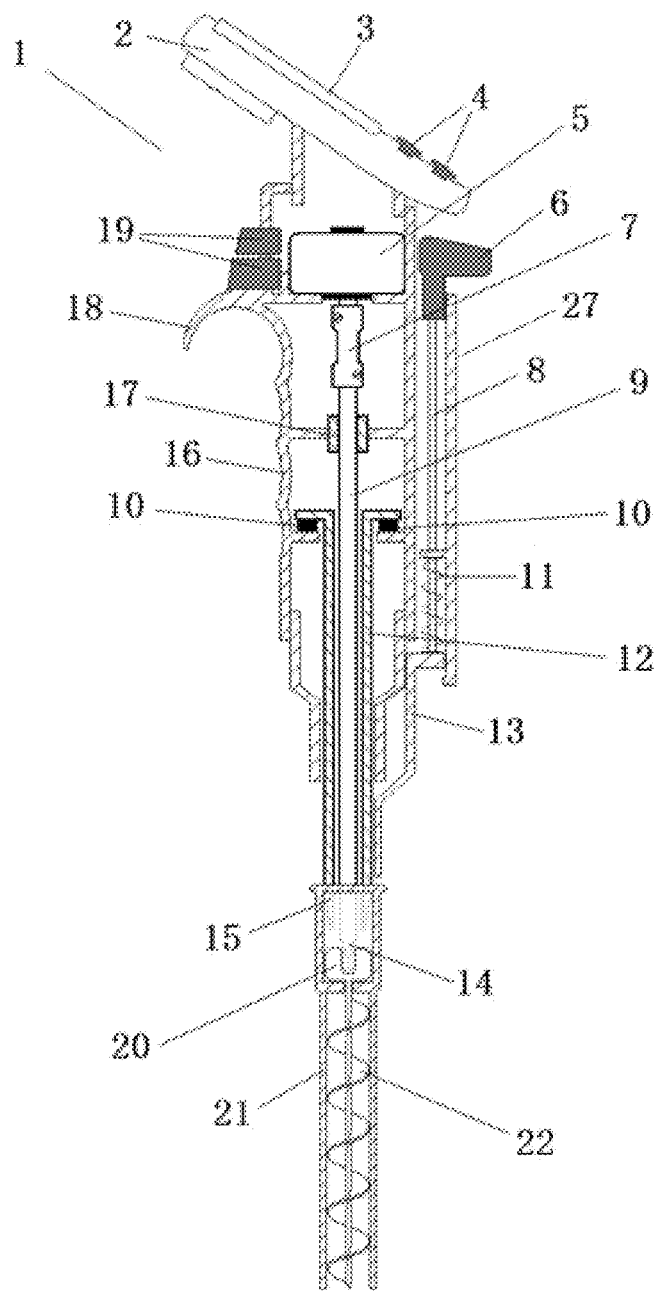
FIG. 1 is a schematic diagram showing a solid transferring device according to an embodiment of the present disclosure.

1: main body; 2: control system mounting shell; 3: display module; 4: operation button; 5: motor; 6: pressing portion;

7: coupling; 8: intermediate linking rod; 9: transmission shaft; 10: weighing sensor; 11: ejector return spring; 12: upper sleeve; 13: ejector rod; 14: transmission shaft head; 15: tip portion; 16: casing; 17: shaft sleeve; 18: support portion; 19: forward and reverse rotation buttons; 20: lance transmission head; 21: lance shell; 22: screw; 23: push rod motor; 24: electric push rod; 25: lead screw; 26: plunger return spring; 27: mounting support; 28: plunger; 29: positioning sensor; 30: forward and reverse rotation buttons; 31: plunger connecting rod; 32: micro vibration motor; 33: vibration-absorbing spring; 34: flexible shaft sleeve; 35: lower sleeve; 36: speed reduction motor; 37: sensor mounting seat; 38: foamed vibration-absorbing layer; 39: vibration isolation connector; 40: vibration sensor.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

The present disclosure provides a solid transferring device includes a main body and a lance. The main body includes a casing, a power system, a weighing system and a control system. The casing is provided with an internal cavity that penetrates through the casing in an up and down direction and is configured to accommodate the power system and the weighing system. The power system includes a driving mechanism and a transmission shaft. The driving mechanism is mounted in the casing and has an output end downwardly connected to the transmission shaft. The transmission shaft has a lower end that emerges from the casing and has a transmission shaft head for matching a lance transmission head. The weighing system includes a weighing sensor mounted in the casing and a sleeve fitted over an outer periphery of the transmission shaft. An upper end of the sleeve has a flange pressed on the weighing sensor, and a lower end of the sleeve emerges from the casing and has a tip portion for matching a lance shell. The lance includes the lance shell, a screw and the lance transmission head. The lance shell is provided with a lance cavity that penetrates through the lance shell in the up and down direction. An upper part of the lance shell has a matching engaging portion for matching the tip portion of the sleeve to allow the main body to catch the lance where the tip portion is inserted into the matching engaging portion. The screw and the lance transmission head are located in the lance cavity. A lower part of the lance transmission head is fixedly connected to an upper end of the screw to drive the screw to rotate around a center axis of the lance. An upper part of the lance transmission head has a matching transmission portion for matching the transmission shaft head to allow the screw to rotate as the transmission shaft rotates. The driving mechanism comprises a motor configured to control the transmission shaft to rotate forwardly or reversely, that when the transmission shaft head is inserted into the matching transmission portion, drives the screw to rotate forwardly or reversely to screw in to take a solid sample or screw out to release the solid sample.

In some embodiments, the casing is provided with an ejector mechanism. The ejector mechanism includes a mounting support, a pressing portion, an intermediate linking rod, an ejector rod and an ejector return spring. The mounting support is connected to a side of the casing. The intermediate linking rod is mounted on the mounting support and is slidable along the mounting support upwards or downwards. The pressing portion is connected to an upper end of the intermediate linking rod and configured to press the intermediate linking rod to move downwards. An upper end of the ejector rod is fixedly connected to a lower end of the intermediate linking rod, and a lower end of the ejector rod leans on a side of a lower end of the sleeve that emerges from the casing, and the ejector rod is configured to push the lance shell downwards under driving of the intermediate linking rod to push the lance out of the main body of the solid transferring device. The ejector return spring is mounted between the ejector rod and the mounting support, and is configured to drive the ejector rod to return its original location after the ejector rod moves downwards.

In some embodiments, the solid transferring device further includes a plurality of lances that have different sizes and specifications. Each lance has a screw with a diameter and a length different from other lances and a lance shell suitable for the screw, such that the different lances are used according to a nature and dosage of the sample and a size of a reagent bottle. The transmission shaft head at the lower end of the transmission shaft has a first convex-concave structure having a shape selected from a line, a cross, a triangle, a pentagon and a plum blossom. The matching transmission portion on the lance transmission head has a second concave-convex structure corresponding to the first convex-concave structure.

In some embodiments, the main body further includes a material-withdrawn vibration device mounted in the casing to act on the transmission shaft and configured to vibrate the transmission shaft when a material is withdrawn. The material-withdrawn vibration device includes a flexible shaft sleeve, a micro vibration motor and a vibration-absorbing spring. The flexible shaft sleeve is fitted over the transmission shaft, and mounted in the casing through the vibration-absorbing spring. The micro vibration motor is connected to the flexible shaft sleeve to drive the transmission shaft to vibrate through the flexible shaft sleeve. The micro vibration motor is mounted in the casing through the vibration absorbing spring. When the transmission shaft vibrates, the lance is driven by the transmission shaft to vibrate to assist unloading of the sample.

In some embodiments, the main body further includes a material-withdrawn vibration device mounted on the casing to act on the sleeve and configured to vibrate the sleeve when a material is withdrawn. The material-withdrawn vibration device includes a micro vibration motor that is mounted on the lower end of the ejector rod and leans on the side of the lower end of the sleeve emerging from the casing. The micro vibration motor is configured to drive the lower end of the ejector rod to vibrate during operation where the lower end of the ejector rod vibrates to touch and vibrate the sleeve and to further vibrate the lance to assist unloading of the sample.

In some embodiments, the sleeve includes an upper sleeve and a lower sleeve that is made of a vibration-absorbing material. A lower part of the upper sleeve is matched and connected to an upper part of the lower sleeve. An upper end of the upper sleeve has a flange pressed on the weighing sensor. A lower end of the lower sleeve emerges from the casing and has a tip portion for matching the lance shell.

In some embodiments, the weighing system is an anti-interference weighing system including a weighing sensor, a vibration sensor, a sensor mounting seat, the sleeve and a vibration isolation connector. The weighing sensor is mounted on the sensor mounting seat. The sleeve is fitted over the outer periphery of the transmission shaft. The lower end of the sleeve emerges from the casing and has the tip portion for matching the lance shell, and the upper end of the sleeve has the flange pressed on the weighing sensor to detect a bearing weight of the sleeve through the weighing sensor. The vibration sensor is mounted on the sensor mounting seat, and configured to synchronously sense a vibration interference to the weighing sensor, and compensate for weighing data of the weighing sensor according to a compensation algorithm to enhance weighing accuracy. The sensor mounting seat is connected to the casing through the vibration isolation connector to reduce a vibration interference of the casing on weighing.

In some embodiments, compensating for the weighing data of the weighing sensor according to the compensation algorithm includes:

obtaining the weighing data by the weighing sensor and synchronously sensing vibration data by the vibration sensor when weighing and transferring the solid sample by an anti-interference solid transferring device, and performing an anti-interference calibration by synchronously compensating for the weighing data with the obtained vibration data to obtain calibrated weighing data; or establishing a vibration filter model before weighing and transferring the solid sample by the anti-interference solid transferring device, obtaining a trained adaptive filter model by training the vibration filter model using a training data set, and performing anti-interference filtering by inputting the weighing data obtained by the weighing sensor into the adaptive filter model to obtain calibrated weighing data when removing and weighing the solid sample by the anti-interference solid transferring device.

In some embodiments, the training data set is constructed by the following steps:

weighing a solid sample with known weight continuously by the anti-interference solid transferring device, obtaining the weighing data of the weighing sensor and the vibration data of the vibration sensor, determining a true value of the solid sample and the corresponding weighing data and vibration data as a training data item, and constructing the training data set with a plurality of training data items.

In some embodiments, the control system is disposed on an upper part of the casing, and comprises a controller, a display module, a control button, a driving module and a power module.

The display module is configured to display weighing information and control information. The control button is configured to input a control command. The driving module is electrically connected to the driving mechanism to control the driving mechanism to operate. The controller is electrically connected to each of the weighing sensor, the display module, the control button, the driving module and the power module.

In some embodiments, the driving mechanism includes the motor and a coupling. The motor is mounted in the casing, and the coupling has an upper end fixedly connected to an output end of the motor and a lower end fixedly connected to the transmission shaft.

In some embodiments, the driving mechanism includes the motor and an electric push rod mechanism composed of an electric push rod and a push rod motor. The push rod motor is downwardly mounted in the casing. The electric push rod has an upper end connected to the push rod motor and a lower end connected to the motor. A mounting portion of the motor is upwardly and fixedly connected to the electric push rod to move upwards or downwards under driving of the push rod motor, and an output end of the motor is downwardly and fixedly connected to the transmission shaft to drive the transmission shaft to rotate and to drive the transmission shaft to move upwards or downwards under the driving of the push rod motor.

In some embodiments, the driving mechanism comprises the motor, a plunger, a plunger connecting rod, a plunger return spring and two positioning sensors that operate together with each other. The plunger is located on the upper part of the casing and is configured to move upwards or downwards along the casing, and the plunger is downwardly and fixedly connected to an upper end of the plunger connecting rod. A mounting portion of the motor is upwardly and fixedly connected to a lower end of the plunger connecting rod to move downwards under driving of the plunger, and an output end of the motor is downwardly and fixedly connected to the transmission shaft to drive the transmission shaft to rotate. The plunger return spring is mounted between the motor and the casing, and is used to drive the plunger to return its original location after releasing the plunger; the two positioning sensors are each mounted in the casing and on the plunger connecting rod and electrically connected to a controller. A control command is sent to the controller when the two positioning sensors approach to each other. The control command is configured to control the motor to rotate forwardly to drive the screw in the lance to rotate forwardly through the transmission shaft, to screw in to take the solid sample.

Compared with the related art, the present disclosure has the following beneficial effects. The solid transferring device for weighing, transferring and dispensing the solid samples is provided. Through the cooperation of the lance and the power system, the weighing system and the control system in the main body of the solid transferring device, the solid samples is weighed and moved, and the weighing result of the solid samples is displayed, which overcome inconvenient transferring, time-consuming and labor-intensive problems in the related art, and have a simple operation, fast and accurate weighing and a good reliability, thereby greatly improving the work efficiency.

Further, by providing the material-withdrawn vibration device on the solid transferring device, a problem that the weighing accuracy is effected since the sample may adhere to the solid transferring device when the material is withdrawn/discharged is overcame, which ensures that the sample is removed completely, thereby further improving the accuracy of the device.

In addition, through a design of a vibration compensation structure, the vibration interference to the weighing may be reduced, thereby further improving the weighing accuracy and stability of the solid transferring device. Therefore, the present disclosure has strong practicability and broad application prospects.

The present disclosure will be further described in detail below with reference to the accompanying drawings.

The present disclosure provides a solid transferring device. The solid transferring device includes a main body 1 and a lance. The main body includes a casing 16, a power system, a weighing system and a control system. The casing 16 is provided with an internal cavity that penetrates through the casing 16 in an up and down direction and is configured to accommodate the power system and the weighing system. The power system includes a driving mechanism and a transmission shaft 9. The driving mechanism is mounted in the casing 16 and has an output end downwardly connected to the transmission shaft 9. The transmission shaft 9 has a lower end that emerges from the casing 16 and has a transmission shaft head 14 for matching a lance transmission head 20. The weighing system includes a weighing sensor 10 and a sleeve 12. The weighing sensor 10 is mounted on a positioning ring in the casing 16, and the sleeve 12 is fitted over an outer periphery of the transmission shaft 9. An upper end of the sleeve 12 has a flange pressed on the weighing sensor 10, and a lower end of the sleeve 12 emerges from the casing 16 and has a tip portion 15 for matching a lance shell 21. The lance includes the lance shell 21, a screw 22 and the lance transmission head 20. The lance shell 21 is provided with a lance cavity that penetrates through the lance shell 21 in the up and down direction. An upper part of the lance shell 21 has a matching engaging portion for matching the tip portion 15 of the sleeve 12 to allow the main body to catch the lance where the tip portion 15 is inserted into the matching engaging portion. The screw 22 and the lance transmission head 20 are located in the lance cavity. A lower part of the lance transmission head 20 is fixedly connected to an upper end of the screw 22 to drive the screw 22 to rotate around a center axis of the lance. An upper part of the lance transmission head 20 has a matching transmission portion for matching the transmission shaft head 14. When the transmission shaft head 14 is inserted into the matching transmission portion, the transmission shaft 9 is rotated forwardly or reversely by a motor 5, to allow the lance transmission head 20 to drive the screw 22 to rotate forwardly or reversely to screw in to take a solid sample or screw out to release the solid sample. The main body 1 of the solid transferring device is provided with an ejector mechanism. The ejector mechanism includes a mounting support 27, a pressing portion 6, an intermediate linking rod 8, an ejector rod 13 and an ejector return spring 11. The mounting support 27 is connected to a side of the casing 16. The intermediate linking rod 8 is mounted on the mounting support and is slidable along the mounting support upwards or downwards. The pressing portion 6 is connected to an upper end of the intermediate linking rod 8 and configured to press the intermediate linking rod 8 to move downwards. An upper end of the ejector rod 13 is fixedly connected to a lower end of the intermediate linking rod 8, and a lower end of the ejector rod 13 leans on a side of a lower end of the sleeve 12 that emerges from the casing 16. In this way, the intermediate linking rod 8 is pressed by the pressing portion 6 to make the ejector rod 13 move downwards to push the lance shell 21 downwards to push the lance out of the main body 1 of the solid transferring device. The ejector return spring 11 is mounted between the ejector rod 13 and the mounting support, and is configured to drive the ejector rod 13 to return its original location e.g., after the ejector rod 13 moves downwards and/or the pressing portion 6 releases.

Figure 2:
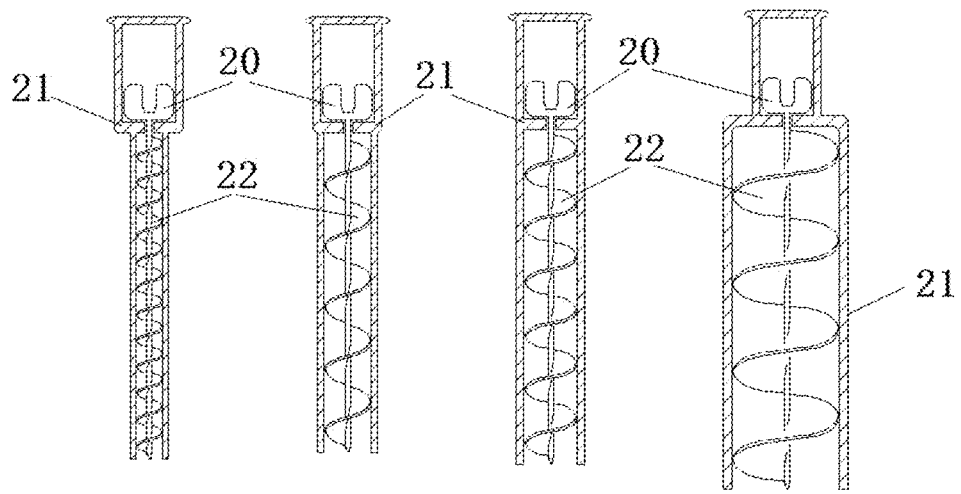
FIG. 2 is a schematic diagram showing different lances matched to a solid transferring device according to an embodiment of the present disclosure.

As shown in FIG. 2, in order to transfer the solid samples with different natures and dosages and be suitable for reagent bottles with different sizes, the solid transferring device further includes a plurality of lances that have different sizes and specifications. Each lance has a screw with a different diameter and length from other lances and a lance shell suitable for such a screw. A lance is selected from the plurality of lances according to a nature and dosage of the sample and a size of a reagent bottle where the sample is transferred to.

The transmission shaft head 14 at the lower end of the transmission shaft has a first convex-concave structure having a shape selected from a line, a cross, a triangle, a pentagon and a plum blossom. The matching transmission portion on the lance transmission head 20 has a second concave-convex structure corresponding to the first convex-concave structure.

A vibration-absorbing structure is provided between the flange of the sleeve 12 and the weighing sensor 10. The vibration-absorbing structure may be a vibration-absorbing spring or a vibration-absorbing rubber pad, and is configured to avoid damage to the solid transferring device caused by the external force.

A support portion 18 is disposed on an outer side of the casing 16, and configured to hang the solid transferring device on other objects.

The solid transferring device may further include a material-withdrawn vibration device. The material-withdrawn vibration device is mounted on the casing 16 or in the casing 16 to act on the transmission shaft 9 or the sleeve and configured to vibrate the transmission shaft 9 or the sleeve when a material is withdrawn.

The sleeve is further provided with an upper sleeve 12 and a lower sleeve 35 that is made of a vibration-absorbing material. In some embodiments of the present disclosure, the lower sleeve is a rubber sleeve. A lower part of the upper sleeve 12 is matched to an upper part of the lower sleeve 35. In some embodiments of the present disclosure, the lower part of the upper sleeve 12 is threaded to the upper part of the lower sleeve 35. An upper end of the upper sleeve 12 has a flange pressed on the weighing sensor 10. A lower end of the lower sleeve 35 emerges from the casing 16 and has the tip portion 15 for matching the lance shell 21. The lower sleeve 35 that is elastic and vibration-absorbing is provided for two functions. In a first case, when the solid transferring device falls or touches with hard objects during use, the lower sleeve is vibration-absorbing and has the buffer function, which may well protect the solid transferring device, especially the weighing sensor from damage. In a second case, when the material is withdrawn, the vibration occurs and the vibration may be transmitted to the weighing sensor. By providing the lower sleeve may avoid the effect on measurement accuracy of the weighing sensor. In some embodiments, a vibration-absorbing structure is provided between the flange of the upper sleeve 12 and the weighing sensor 10. The vibration-absorbing structure may be a vibration-absorbing spring or a vibration-absorbing rubber pad, and is configured to avoid damage to the solid transferring device caused by an external force.

The weighing system is an anti-interference weighing system. The anti-interference weighing system includes the weighing sensor 10, a vibration sensor 40, a sensor mounting seat 37, the sleeve and a vibration isolation connector 39. The weighing sensor 10 is mounted on the sensor mounting seat 37. The sleeve is fitted over the outer periphery of the transmission shaft with a certain gap. The lower end of the sleeve emerges from the casing 16 and has the tip portion 15 for matching the lance shell 21, and the upper end of the sleeve has the flange pressed on the weighing sensor 10 to detect a bearing weight of the sleeve through the weighing sensor. The vibration sensor 40 is mounted on the sensor mounting seat 37, and configured to synchronously sense a vibration interference to the weighing sensor, and compensate for weighing data of the weighing sensor according to a compensation algorithm. In this way, the weighing accuracy is improved. The sensor mounting seat 37 is connected to the casing 16 through the vibration isolation connector 39 to reduce the vibration interference to the casing 16 and thus the weighing.

Compensating for the weighing data of the weighing sensor according to the compensation algorithm may be implemented in different ways. In a way, during transferring and weighing the solid sample by the anti-interference solid transferring device, the weighing data is obtained by the weighing sensor, and the vibration data is synchronously sensed by the vibration sensor. The weighing data can be compensated synchronously with the obtained vibration data to obtain calibrated weighting data.

In another way, a vibration filter model is established before weighing and transferring the solid sample by the anti-interference solid transferring device, and a trained adaptive filter model is obtained by training the vibration filter model using a training data set. During weighing and transferring the solid sample by the anti-interference solid transferring device, anti-interference filtering is performed, that is, the weighing data is obtained by the weighing sensor, and is input into and processed by the adaptive filter model, and thus the calibrated weighting data is obtained. The training data set is constructed by the following operations. The solid samples of the known weights are taken by the anti-interference solid transferring device, and the weighing data of the weighing sensor and the vibration data of the vibration sensor are obtained accordingly. The true weight value of the solid sample and the corresponding weighing data and vibration data are determined as one training data item, and the training data set is constructed with a plurality of training data items.

In some embodiments, the vibration isolation connector 39 is a vibration isolation rubber sleeve that is made of a rubber material, and the sensor mounting seat 37 is connected to an inner side wall of the casing 16 through the vibration isolation rubber sleeve.

In order to further improve the anti-vibration effect, a foamed vibration-absorbing layer 38 is fitted over the outer side of the casing 16.

Figure 3:
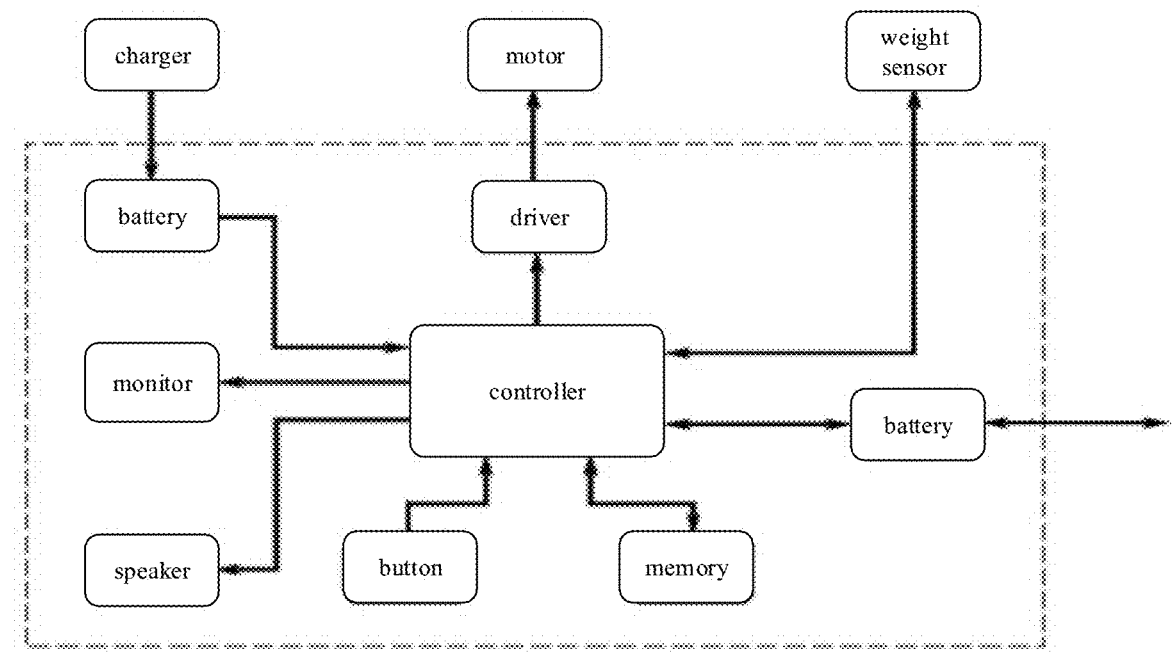
FIG. 3 is a block diagram of a control system according to an embodiment of the present disclosure.

The control system is disposed on an upper part of the casing 16. As shown in FIG. 3, the control system includes a controller, a display module 3 (that is, a monitor), a control button, a driving module and a power module. In some embodiments of the present disclosure, the power module may be a rechargeable battery. The display module 3 is configured to display weighing information and control information. The control button is configured to input a control command.

The driving module is electrically connected to the driving mechanism to control the driving mechanism to operate. The controller is electrically connected to each of the weighing sensor, the display module, the control button, the driving module and the power module.

As shown in FIG. 1, the control system includes a control system installation shell 2 that is disposed on an upper part of the casing. The control button includes forward and reverse rotation buttons 19 and an operation button 4 for performing other settings or controls except forward and reverse rotation. The display module 3 and the operation button 4 are disposed on an upper panel of the control system installation shell 2. The forward and reverse rotation buttons 19 is disposed on the casing 16 of the main body 1 of the solid transferring device. The controller, the driving module and the power module are disposed in the control system installation shell 2. As shown in FIG. 3, the controller is provided with a data interface for data communication with an upper computer through the data interface. The operation of the solid transferring device is controlled by the controller, and the controller is provided with a memory for storing pre-programmed operations and functions. An instruction is sent to the controller through the operation button 4, the forward and reverse rotation buttons 19 in combination with the monitor 3, such that the controller controls the driving module to make the motor 5 work. The controller receives information from the weighing sensor 10, and a calculation result is displayed on the monitor 3.

The driving module may be further electrically connected to the material-withdrawn vibration device, such that the controller may control the material-withdrawn vibration device to work through the driving module.

The controller may be further electrically connected to the vibration sensor. The compensation algorithm is built in the controller to perform the calibration on the weighing data of the weighing sensor.

In the present disclosure, the material-withdrawn vibration device of the solid transferring device may be implemented by the following ways.

Figure 8:
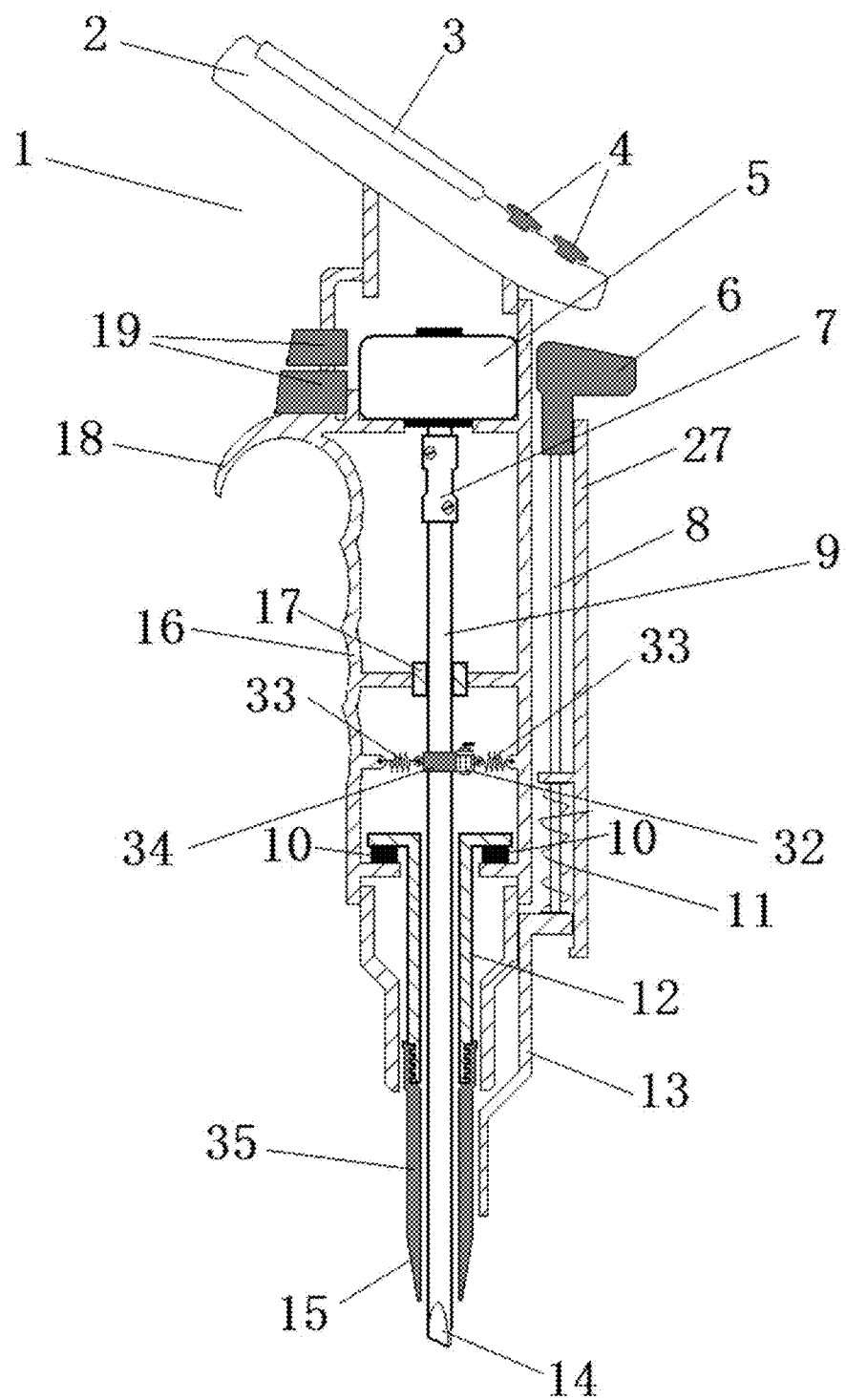
FIG. 8 is a schematic diagram showing a main body of a solid transferring device according to an embodiment of the present disclosure.
Figure 10:
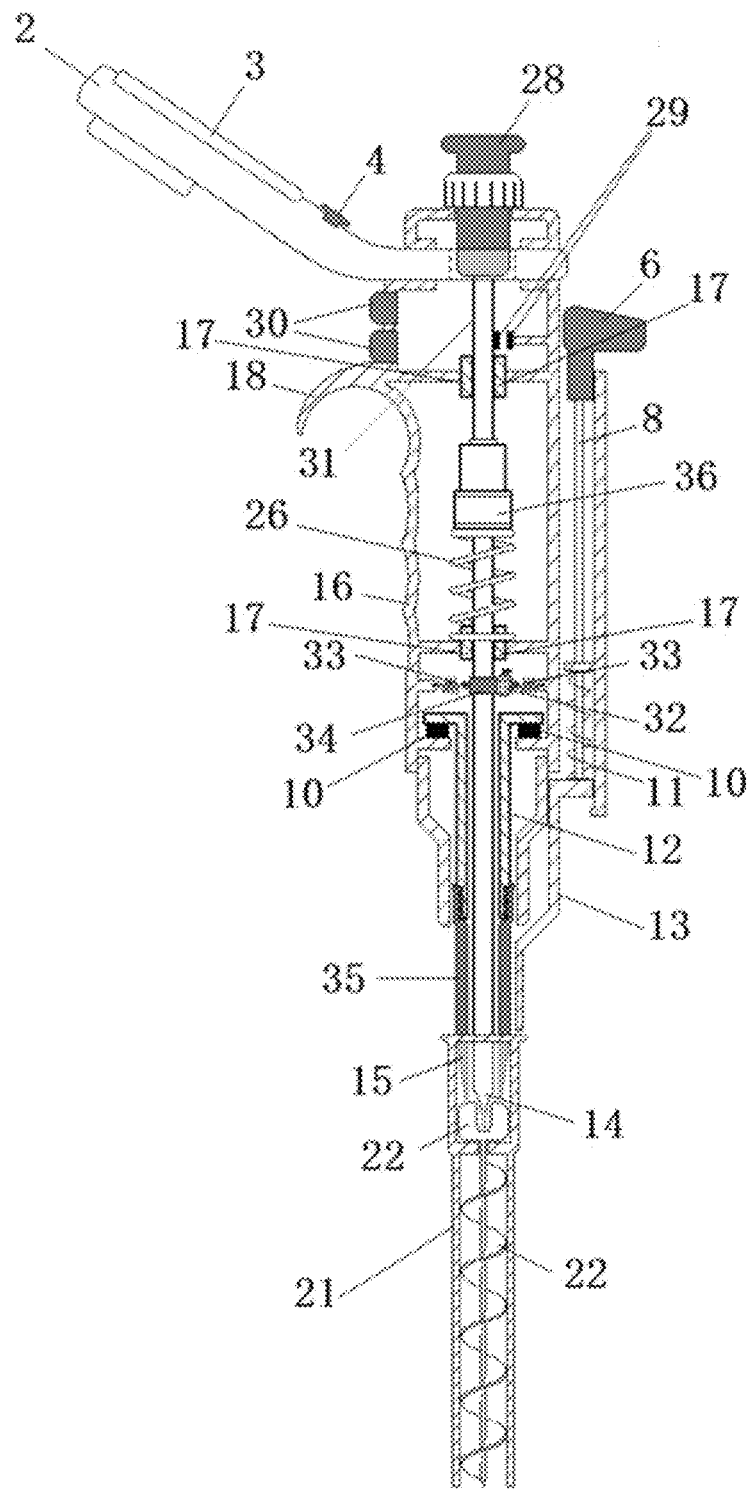
FIG. 10 is a schematic diagram showing a solid transferring device when a plunger is pressed according to an embodiment of the present disclosure.
Figure 12:
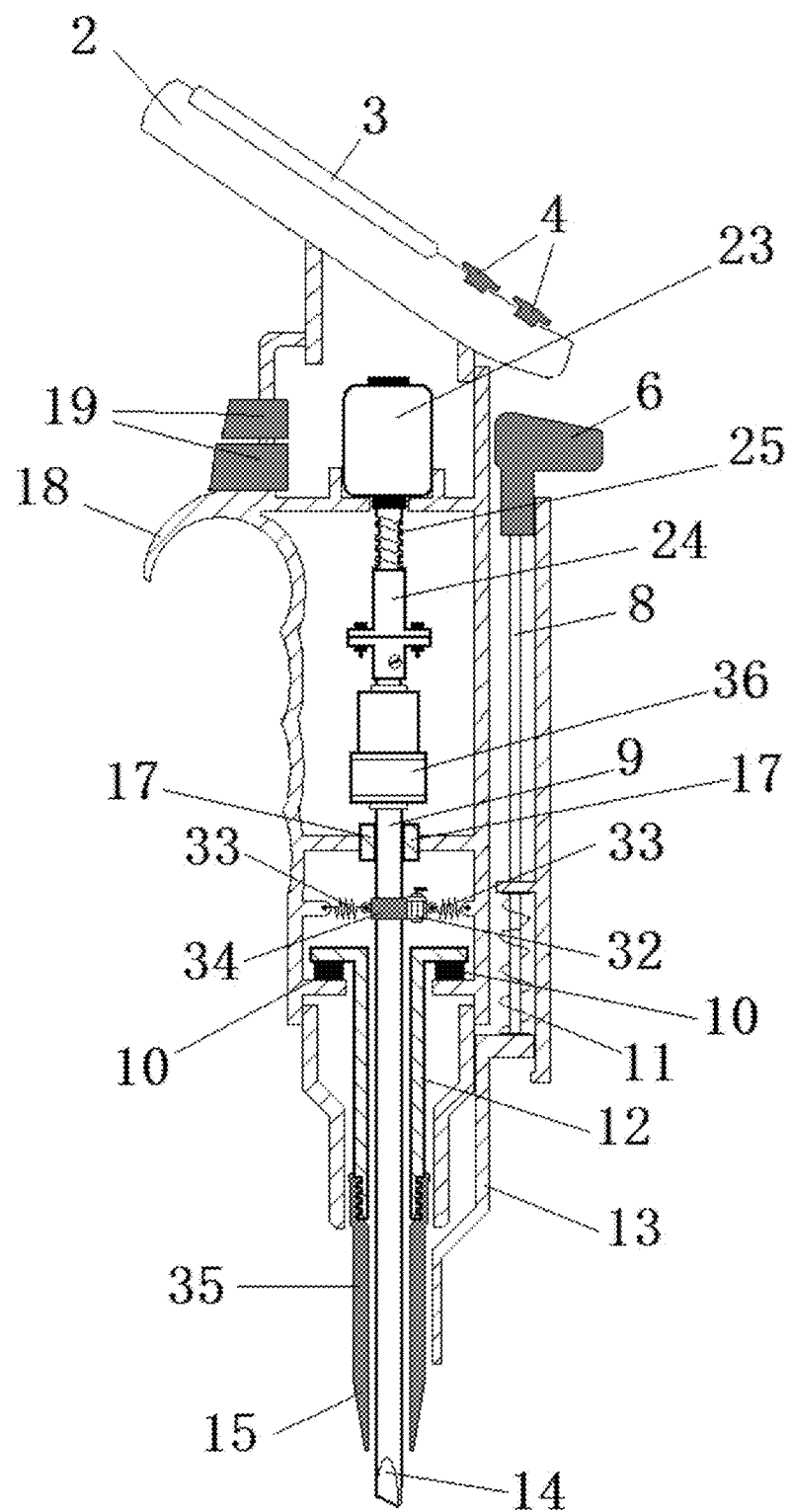
FIG. 12 is a schematic diagram showing a solid transferring device when an electric push rod is extended according to an embodiment of the present disclosure.

As shown in FIGS. 8, 10 and 12, the material-withdrawn vibration device includes a flexible shaft sleeve 34 (that is, a rubber shaft sleeve in the above-mentioned embodiments), a micro vibration motor 32 and a vibration-absorbing spring 33. The flexible shaft sleeve 34 is fitted over the transmission shaft 9, and mounted in the casing 16 through the vibration-absorbing spring 33. The micro vibration motor 32 is connected to the flexible shaft sleeve 34 to drive the transmission shaft 9 to vibrate through the flexible shaft sleeve 34. The micro vibration motor 32 is mounted in the casing 16 through the vibration absorbing spring 33. When the material is withdrawn, the micro vibration motor 32 drives the transmission shaft 9 to vibrate through the flexible shaft sleeve 34, and the transmission shaft 9 drives the lance transmission shaft head 20 to vibrate through the transmission shaft head 14, thereby driving the lance to vibrate. In this way, sample powders adhering to an inner wall of the lance or the screw rob are shaken off, which may completely remove the sample and improve the discharging. It should be noted that since the lower sleeve is made of the vibration-absorbing material, the vibration of the lance is mostly absorbed by the lower sleeve and will not be transmitted upwards, thereby improving the weighing accuracy of the weighing sensor.

Figure 9:
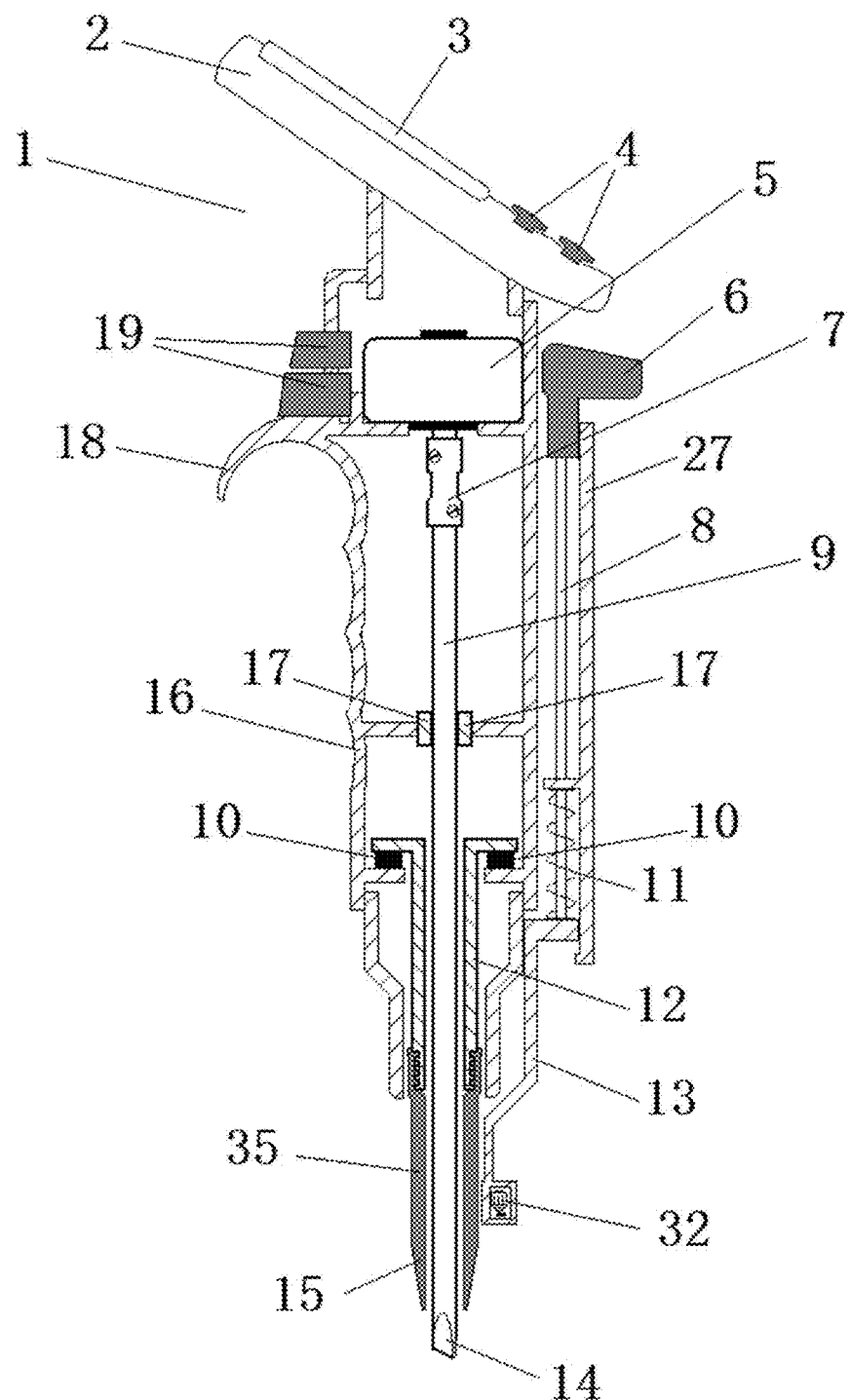
FIG. 9 is a schematic diagram showing a main body of a solid transferring device according to an embodiment of the present disclosure.
Figure 11:
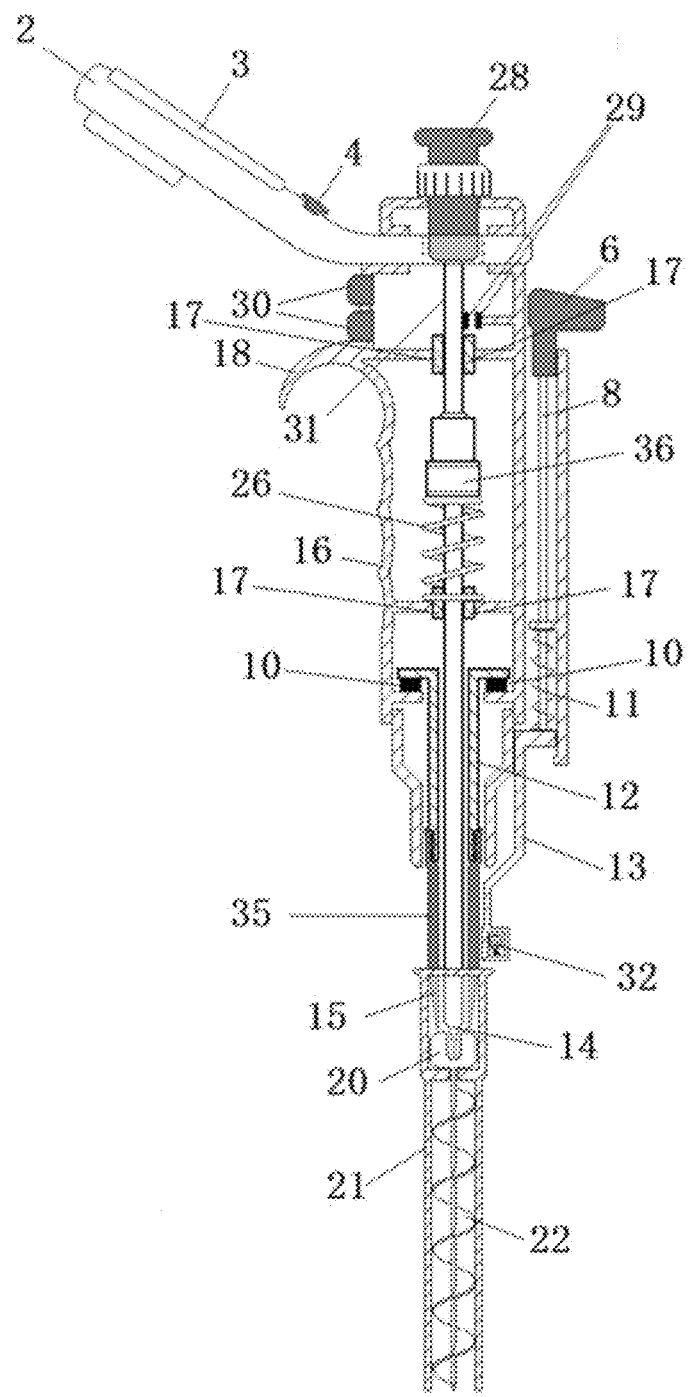
FIG. 11 is a schematic diagram showing a solid transferring device when a plunger is pressed according to an embodiment of the present disclosure.
Figure 13:
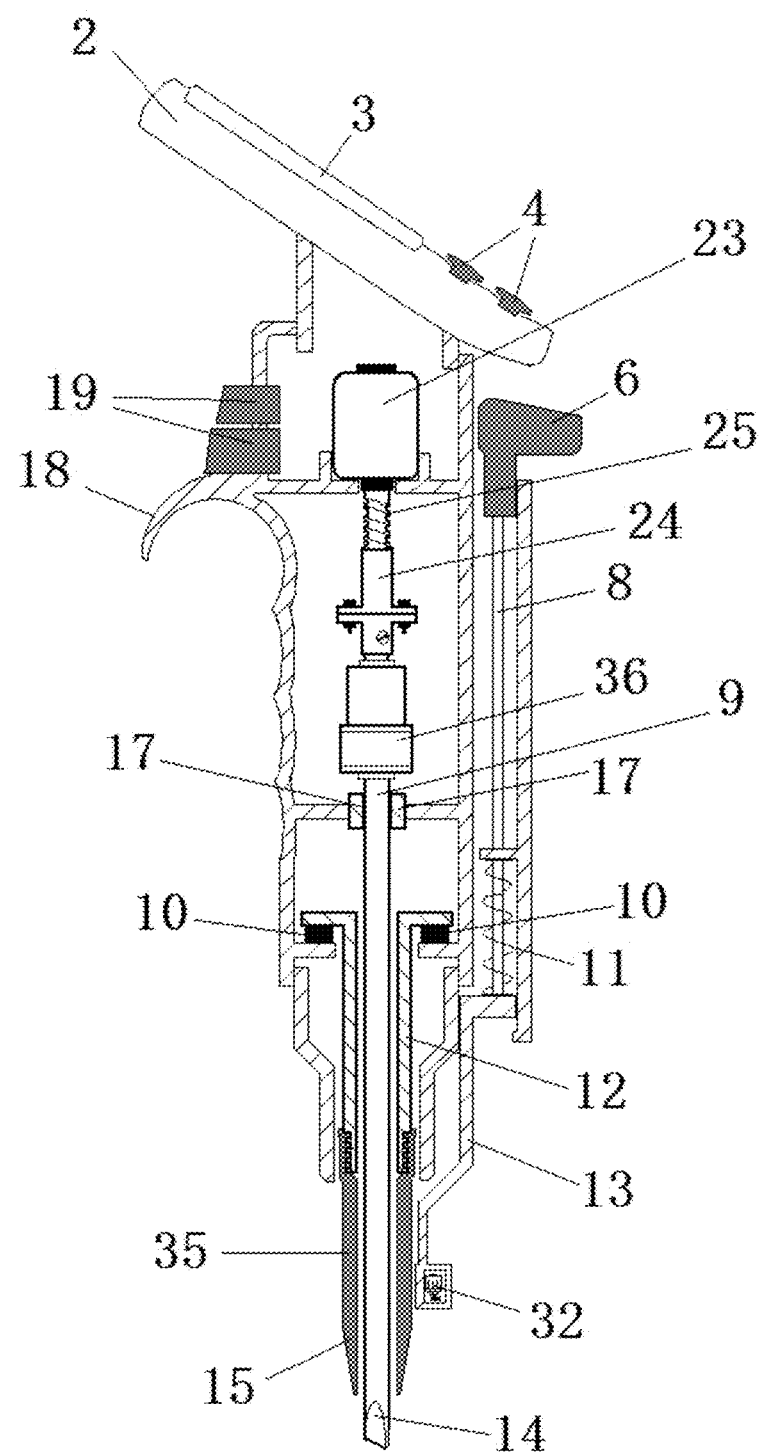
FIG. 13 is a schematic diagram showing a solid transferring device when an electric push rod is extended according to an embodiment of the present disclosure.

As shown in FIG. 9, FIG. 11 and FIG. 13, the material-withdrawn vibration device includes a micro vibration motor 32 that is mounted on the lower end of the ejector rod 13. The micro vibration motor 32 leans on the side of the lower end of the sleeve 35 emerging from the casing 16, a certain gap is between the sleeve 35 and the lower end of the ejector rod 13. When the material is withdrawn, the micro vibration motor 32 vibrates to drive the lower end of the ejector rod to vibrate. When the lower end of the ejector rod vibrates, the lower sleeve is touched to be driven to vibrate, thereby driving the lance shell 21 to vibrate through the lower sleeve, and further driving the lance to vibrate. In this way, sample powders adhering to an inner wall of the lance or the screw rob are shaken off, which may completely remove the sample and improve the discharging. As mentioned above, since the lower sleeve is made of the vibration-absorbing material, the vibration of the lance is mostly absorbed in the lower sleeve and will not be transmitted upwards, thereby improving the measurement accuracy of the weighing sensor.

In the present disclosure, the driving mechanism of the solid transferring device may be implemented by the following ways.

As shown in FIG. 1, the driving mechanism includes a motor 5 and a coupling 7. The motor 5 is mounted in the casing 16, and the coupling 7 has an upper end fixedly connected to an output end of the motor 5 and a lower end fixedly connected to the transmission shaft 9.

When the above-mentioned solid transferring device is used to weigh, transfer and dispense the solid sample, the main body 1 of the solid transferring device is inserted into the lance first, and positions of the tip portion 15 of the solid transferring device and the lance are adjusted to connect the transmission shaft head 14 to the lance transmission head 20 of the lance. According to actual needs, a rotation condition of the motor 5 is preset through the operation button 4 and the monitor 3. A user may hold the solid transferring device through a holding position on the main body 1, and any of the forward and reverse rotation buttons 9 is pressed with the index finger of the user to control the motor to rotate forwardly or reversely, or stop. The lance of the solid transferring device is placed vertically and faces down, and the operation button 4 is pressed with the thumb of the user. The controller may control the monitor 3 to display information converted from signals sent from the weighing sensor 10, the user can read the information displayed on the monitor and perform weighing settings. When the solid sample is weighed, the lance of the solid transferring device is inserted into the reagent bottle to contact the solid sample. The forward rotation button 19 is pressed with the index finger, such that the motor 5 drives the coupling 7 and the transmission shaft (driving shaft) 9 to rotate forwardly. A force is transmitted to the screw 22 of the lance through the transmission shaft head 14 and the lance transmission head 20. A shaft sleeve 17 is fitted over the transmission shaft, and the casing 16 provides a connector from a wall of the casing to the shaft sleeve 17. The shaft sleeve 17 ensures a stable and concentric rotation of the transmission shaft (the driving shaft) 9. The screw 22 of the lance rotates forwardly under the force to screw the solid sample into the lance. The forward rotation button 19 is released at any time to observe whether the weighing reading on the monitor 3 reaches a required weight. When the weighing reading reaches the required weight, the solid transferring device retreats from the reagent bottle. The lance of the solid transferring device is inserted into another container, the reverse rotation button 19 is pressed with the index finger, such that the screw 22 of the lance is driven by the motor 5 to rotate reversely. At the same time, the weighed sample is pushed into the container. After the weighing and the transferring process is completed, the pressing portion 6 is pressed to drive the ejector rod 13 to push out the lance sleeved on the tip portion 15 of the main body of the solid transferring device.

In order to avoid an impact of the contact between the transmission shaft head 14 and the lance transmission head 20 on the sample weighing result, and to improve the weighing accuracy, the present disclosure provides a solid transferring device with an electric push rod and a push-type solid transferring device.

Figure 4:
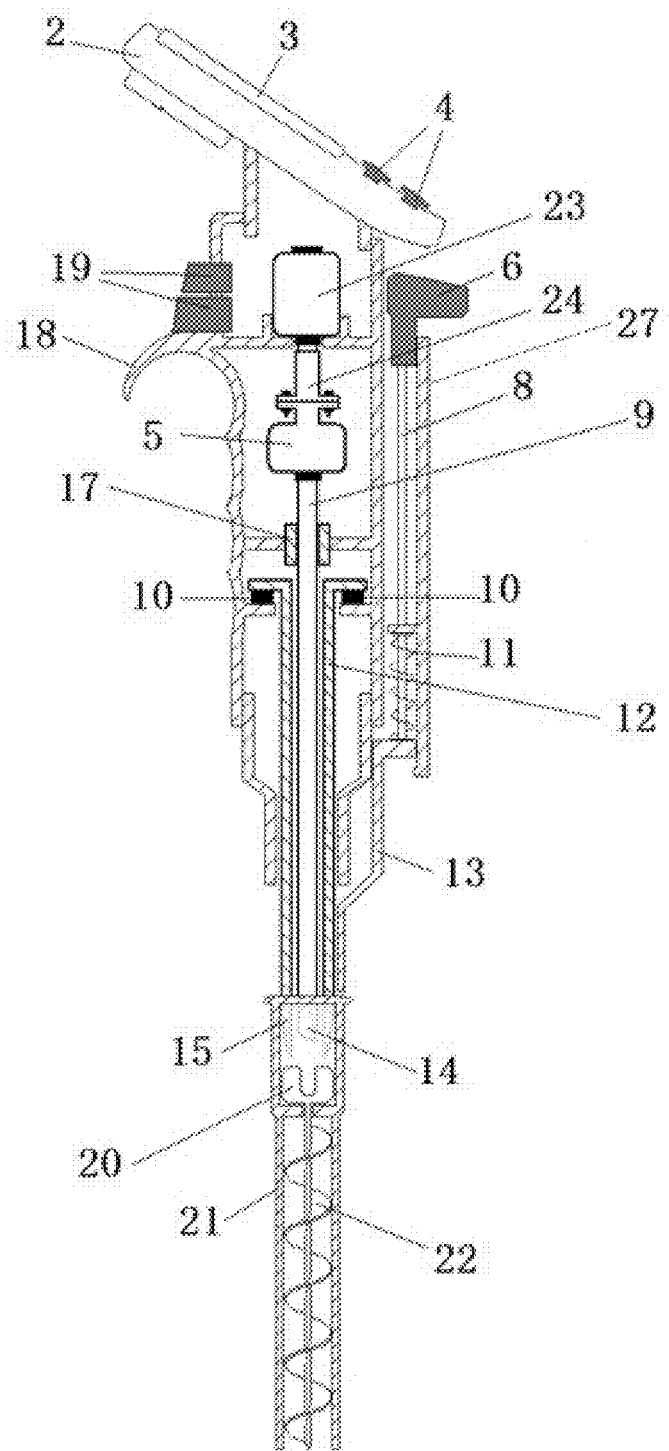
FIG. 4 is a schematic diagram showing a solid transferring device when an electric push rod is retracted according to an embodiment of the present disclosure.
Figure 5:
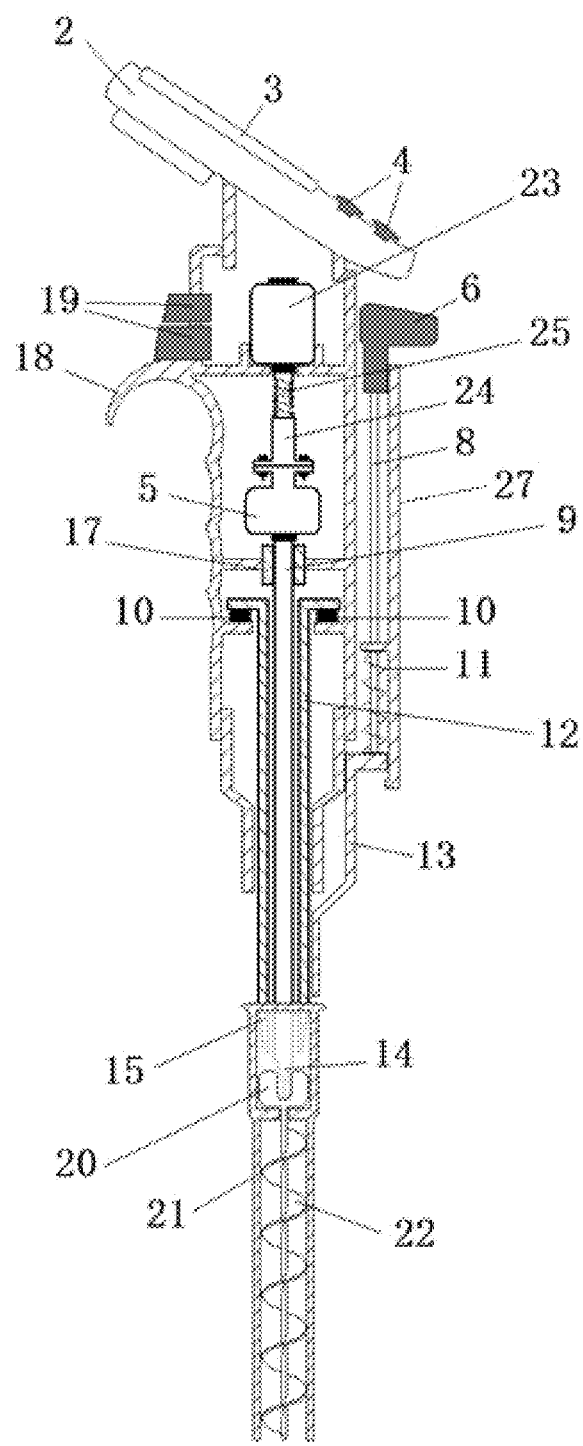
FIG. 5 is a schematic diagram showing a solid transferring device when an electric push rod is extended according to an embodiment of the present disclosure.

As shown in FIGS. 4 and 5, the solid transferring device with the electric push rod is provided. The driving mechanism includes a motor 5 and an electric push rod mechanism composed of an electric push rod 24, a lead screw 25 and a push rod motor 23. The push rod motor 23 is downwardly mounted in the casing 16. The electric push rod 24 has an upper end connected to the push rod motor 23 and a lower end connected to the motor 5. A mounting portion of the motor 5 is upwardly and fixedly connected to the electric push rod 24 to move upwards or downwards under driving of the push rod motor 23. An output end of the motor 5 is downwardly and fixedly connected to the transmission shaft 9 to drive the transmission shaft 9 to rotate and to drive the transmission shaft 9 to move upwards or downwards under the driving of the push rod motor 23.

Before the solid sample is weighted by the above-mentioned solid transferring device, a weighing reading on the monitor 3 is blank, and the electric push rod is in a retracted state, that is, the transmission shaft head 14 is retracted in a space defined by the sleeve 12 and the tip portion 15 of the solid transferring device, and the transmission shaft head 14 is out of contact with the lance transmission head 20 of the lance (as shown in FIG. 4), which avoids influence on the blank weighing reading. The forward rotation button 19 of the solid transferring device is pressed to start sampling. Under pre-programmed operations, the electric push rod motor 23 drives the lead screw 25 to rotate forwardly, and the electric push rod 24 pushes out the transmission shaft head 14 to match with the lance transmission head 20 of the lance (as shown in FIG. 5). Then, the motor 5 rotates forwardly to transmit a force to the screw 22 of the lance through the transmission shaft head 14 and the lance transmission head 20. The screw 22 rotates forwardly under the force to screw the solid sample into the lance. The forward rotation button 19 is released at any time, and the motor 5 and the screw 22 stop under the pre-programmed operations. The electric push rod motor 23 immediately rotates reversely and drives the transmission shaft head 14 back to the space inside of the tip portion 15 of the solid transferring device, such that the transmission shaft head 14 is out of contact with the lance transmission head 20. By observing the weighing reading on the monitor 3, if a desired weight is not reached, the forward rotation button 19 of the solid transferring device is pressed again to continue the sampling. The above-mentioned operations are repeated several times until the desired weight is reached. Since the transmission shaft head 14 is retracted into the space inside of the tip portion 15 of the solid transferring device during weighing, the interference caused by contact with the lance transmission head 20 is avoided, and the weighing accuracy of the sample is improved.

Under the pre-programmed operations, the electric push rod is generally in the retracted state, and only starts to extend when the forward or reverse rotation button of the solid transferring device is pressed. When the electric push rod is extended, the transmission shaft head is pushed out to be matched with the lance transmission head of the lance to realize the forward or reverse rotation of the screw. Once the forward or reverse rotation button is released and the sample is weighed, the transmission shaft head is retreated into the space inside of the tip portion of the solid transferring device, which avoids the interference caused by contact with the lance transmission head and improves the weighing accuracy of the sample.

Figure 6:
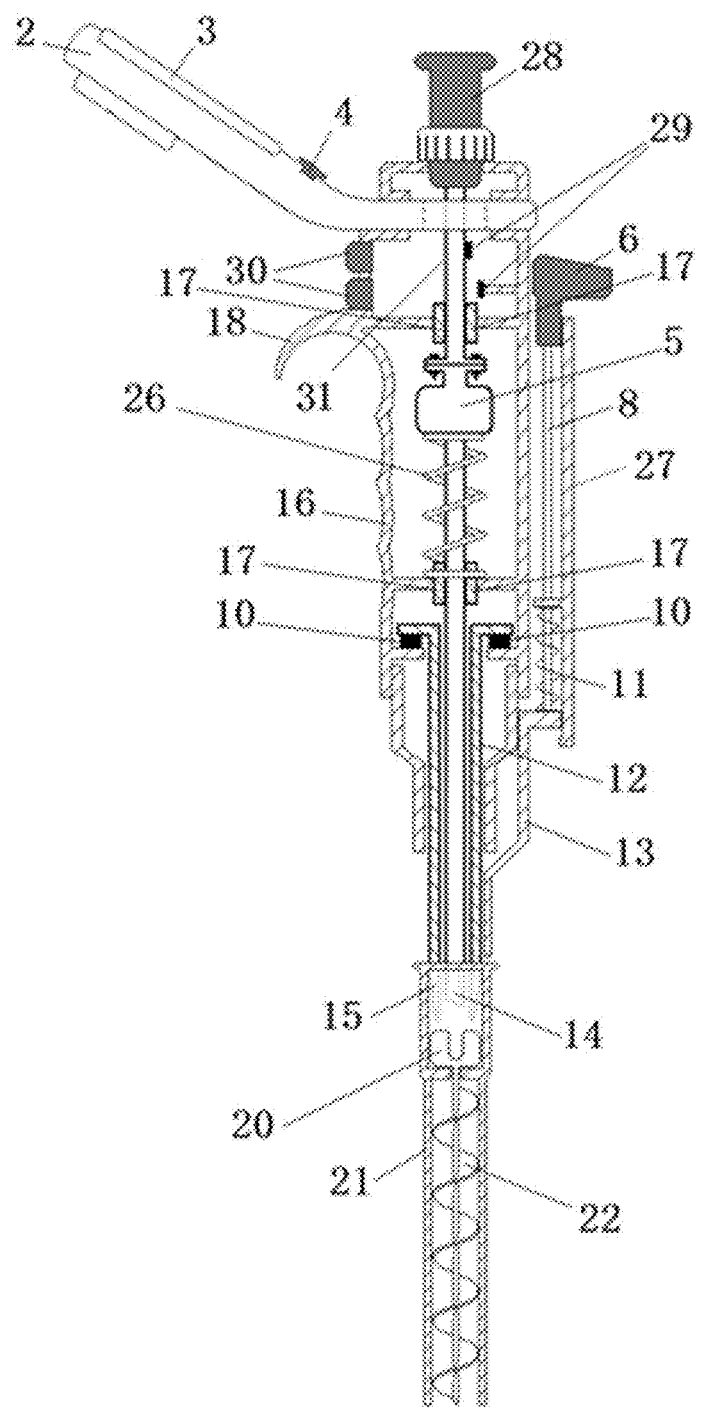
FIG. 6 is a schematic diagram showing a solid transferring device when a plunger is not pressed according to an embodiment of the present disclosure.
Figure 7:
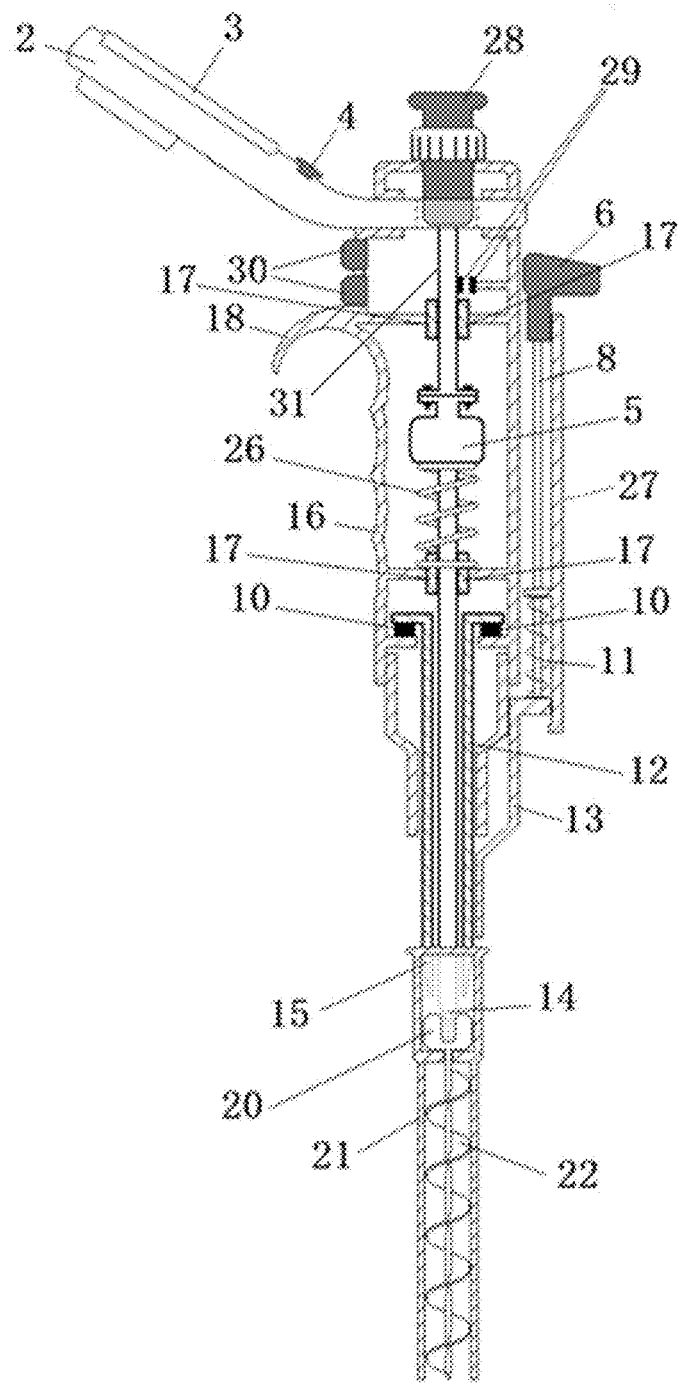
FIG. 7 is a schematic diagram showing a solid transferring device when a plunger is pressed according to an embodiment of the present disclosure.

As shown in FIGS. 6 and 7, the push-type solid transferring device is provided. The driving mechanism includes a motor 5, a plunger 28, a plunger connecting rod 31, a plunger return spring 26 and two positioning sensors 29 that operate together with each other. The plunger 28 is located on the upper part of the casing 16 and is configured to move upwards or downwards along the casing 16, and the plunger 28 is downwardly and fixedly connected to an upper end of the plunger connecting rod 31. A mounting portion of the motor 5 is upwardly and fixedly connected to a lower end of the plunger connecting rod 31 to move downwards under driving of the plunger 28, and an output end of the motor 5 is downwardly and fixedly connected to the transmission shaft 9 to drive the transmission shaft 9 to rotate. The plunger return spring 26 is mounted between the motor 5 and the casing 16. Once the pressing force on the plunger is released, the plunger return spring 26 can make the related components return to their original locations. The two positioning sensors 29 are each mounted in the casing 16 and on the plunger connecting rod 31, and the two positioning sensors 29 are electrically connected to the controller, and send a control command to the controller when the two positioning sensors 29 approach to each other. The control command may instruct the controller to control the motor 5 to rotate forwardly to drive the screw in the lance to rotate forwardly through the transmission shaft 9, so as to screw in to take the solid sample.

Under an elastic force of the plunger return spring 26, the above-mentioned solid transferring device retracts the transmission shaft head 14 in a space defined by the sleeve 12 and the tip portion 15 of the solid transferring device, and the transmission shaft head 14 is out of contact with the lance transmission head 20 of the lance (as shown in FIG. 6). The sample is weighted and the motor 5 is set through the operation button 4 and the monitor 3, and a weight reading on the monitor 3 is observed when no sample is taken. At this time, the positioning sensors 29 are separated from each other, and the motor 5 is in a stopped state. A forward rotation touch button 30 is lightly touched to transmit a forward rotation signal to a driving control circuit for storage, and the driving control circuit is arranged in a control system mounting shell 2. The plunger 28 is pressed, such that the transmission shaft head 14 extends out of the tip portion 15 of the solid transferring device to match with the lance transmission head of the lance (as shown in FIG. 7). At the same time, the two positioning sensors 29 are close to each other, such that a circuit of the power system of the solid transferring device is energized. Under an operation of the driving control circuit that pre-stores the signal of the forward rotation, the motor 5 drives the screw 22 of the lance to rotate forwardly to screw the solid sample into the lance. The plunger 28 is released, such that the transmission shaft head 14 retracts into the space defined by the sleeve 12 under the elastic force of the plunger return spring 26, the positioning sensors 29 are separated from each other, and the motor 5 stops rotating. By observing the weighing reading on the monitor 3, if the desired weight is not reached, the plunger 28 is pressed again to continue the sampling. The above-mentioned operations are repeated several times until the desired weight is reached. Since the transmission shaft head 14 is retracted into the space inside of the tip portion 15 of the solid transferring device during weighing, the interference caused by contact with the lance transmission head 20 is avoided, and the weighing accuracy of the sample is improved.

When the solid transferring device is not used to weight and transfer the solid sample, the transmission shaft head is out of contact with the lance transmission head of the lance. By pressing the plunger, the transmission shaft head extends out of the tip portion of the solid transferring device to be matched with and in contact with the lance transmission head of the lance. Under an operation of the driving control circuit that pre-stores the signal of the forward rotation, the motor drives the screw of the lance to rotate forwardly to screw the solid sample into the lance. Once the plunger is released and the sample is taken in and weighed, the transmission shaft head retreats into the space inside of the tip portion of the solid transferring device, which avoids the interference caused by contact with the lance transmission head and improves the weighing accuracy of the sample.

As shown in FIG. 8 or in FIG. 9, the driving mechanism includes a motor 5 and a coupling 7. The motor 5 is mounted in the casing 16, and the coupling 7 has an upper end fixedly connected to an output end of the motor 5 and a lower end fixedly connected to the transmission shaft 9.

When the above-mentioned solid transferring device is used to, weigh, transfer and dispense the solid sample, the main body 1 of the solid transferring device is inserted into the lance first, and positions of the tip portion 15 of the solid transferring device and the lance are adjusted to connect the transmission shaft head 14 to the lance transmission head 20 of the lance. According to actual needs, a rotation condition of the motor 5 is preset through the operation button 4 and the monitor 3. A user may hold the solid transferring device through a holding position on the main body 1, and any of the forward and reverse rotation buttons 9 is pressed with the index finger to control the motor to rotate forwardly or reversely, or stop. The lance of the solid transferring device is in a vertical state, and the operation button 4 is pressed with the thumb of the user. The controller may control the monitor 3 to display information converted from signals sent from the weighing sensor 10, the user can read the information displayed on the monitor and perform weighing settings. When the solid sample is weighed, the lance of the solid transferring device is inserted into the reagent bottle to contact the solid sample. The forward rotation button 19 is pressed with the index finger, such that the motor 5 drives the coupling 7 and the transmission shaft (driving shaft) 9 to rotate forwardly. A force is transmitted to the screw 22 of the lance through the transmission shaft head 14 and the lance transmission head 20. The shaft sleeve 17 ensures a stable and concentric rotation of the transmission shaft (the driving shaft) 9. The screw 22 of the lance rotates forwardly under the force to screw the solid sample into the lance. The forward rotation button 19 is released at any time to observe whether the weighing reading on the monitor 3 reaches a required weight. When the weighing reading reaches the required weight, the solid transferring device retreats from the reagent bottle. The lance of the solid transferring device is inserted into another container, the reverse rotation button 19 is pressed with the index finger, such that the screw 22 of the lance is driven by the motor 5 to rotate reversely. At the same time, the weighed sample is pushed into the container. After the weighing and the transferring process is completed, the pressing portion 6 is pressed to drive the ejector rod 13 to push out the lance sleeved on the tip portion 15 of the main body of the solid transferring device.

In order to avoid an impact of the contact between the transmission shaft head 14 and the lance transmission head 20 on the sample weighing result, and to improve the weighing accuracy, the present disclosure provides a solid transferring device with an electric push rod and a push-type solid transferring device.

Figure 14:
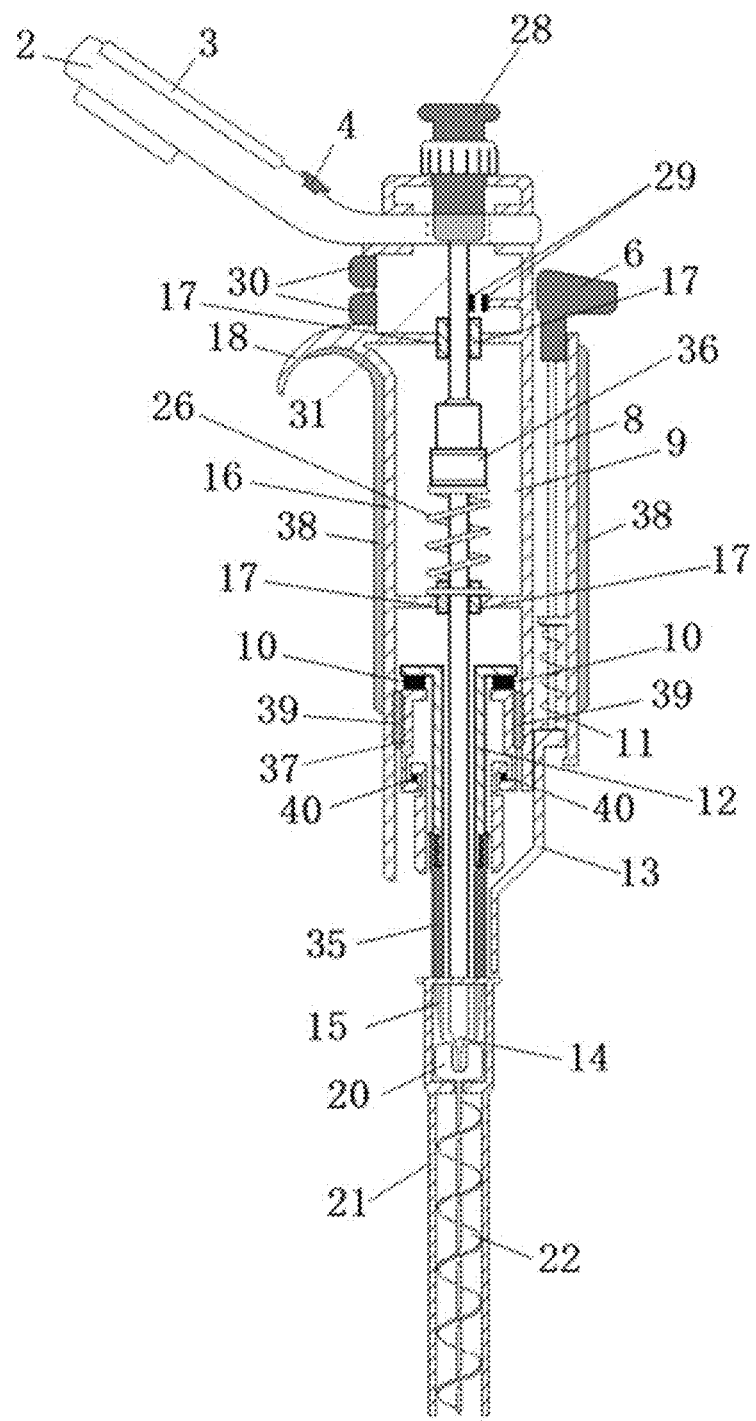
FIG. 14 is a schematic diagram showing a solid transferring device when a plunger is pressed according to an embodiment of the present disclosure.

As shown in FIG. 10, FIG. 11, or FIG. 14, the push-type solid transferring device is provided. The driving mechanism includes a speed reduction motor 36, a plunger 28, a plunger connecting rod 31, a plunger return spring 26 and two positioning sensors 29 that operate together with each other. The plunger 28 is located on the upper part of the casing 16 and is configured to move upwards or downwards along the casing 16, and the plunger 28 is downwardly and fixedly connected to an upper end of the plunger connecting rod 31. A mounting portion of the speed reduction motor 36 is upwardly and fixedly connected to a lower end of the plunger connecting rod 31. In this way, it will move downwards under driving of the plunger 28. An output end of the speed reduction motor 36 is downwardly and fixedly connected to the transmission shaft 9. In this way, the transmission shaft 9 may be driven by the motor 36 to rotate. The plunger return spring 26 is mounted between the speed reduction motor 36 and the casing 16. Once the pressing force on the plunger is released, the plunger return spring 26 can make the related components return to their original locations. The two positioning sensors 29 are each mounted in the casing 16 and on the plunger connecting rod 31, and the two positioning sensors 29 are electrically connected to the controller, and send a control command to the controller when the two positioning sensors 29 approach to each other. The control command may instruct the controller to control the speed reduction motor 36 to rotate forwardly to drive the screw in the lance to rotate forwardly through the transmission shaft 9, so as to screw in to take the solid sample.

Under an elastic force of the plunger return spring 26, the above-mentioned solid transferring device retracts the transmission shaft head 14 in a space defined by the sleeve 12 and the tip portion 15 of the solid transferring device, and the transmission shaft head 14 is out of contact with the lance transmission head 20 of the lance. The sample is weighted and the speed reduction motor 36 is set through the operation button 4 and the monitor 3, and a weight reading on the monitor 3 is observed when no sample is taken. At this time, the positioning sensors 29 are separated from each other, and the speed reduction motor 36 is in a stopped state. A forward rotation touch button 30 is lightly touched to transmit a forward rotation signal to a driving control circuit for storage, and the circuit is arranged in a control system mounting shell 2. The plunger 28 is pressed, such that the transmission shaft head 14 extends out of the tip portion 15 of the solid transferring device to match with the lance transmission head of the lance. At the same time, the two positioning sensors 29 are close to each other, such that a circuit of the power system of the solid transferring device is energized. Under an operation of the driving control circuit 2 that pre-stores the signal of the forward rotation, the speed reduction motor 36 drives the screw 22 of the lance to start to rotate forwardly to screw the solid sample into the lance. The plunger 28 is released, such that the transmission shaft head 14 retracts into the space defined by the sleeve 12 under the elastic force of the plunger return spring 26, the positioning sensors 29 are separated from each other, and the speed reduction motor 36 stops rotating. By observing the weighing reading on the monitor 3, if the desired weight is not reached, the plunger 28 is pressed again to continue the sampling. The above-mentioned operations are repeated several times until the desired weight is reached. Since the transmission shaft head 14 is retracted into the space inside of the tip portion 15 of the solid transferring device during weighing, the interference caused by contact with the lance transmission head 20 is avoided, and the weighing accuracy of the sample is improved.

When the solid transferring device is not used to weight and transfer the solid sample, the transmission shaft head is out of contact with the lance transmission head of the lance. By pressing the plunger, the transmission shaft head extends out of the tip portion of the solid transferring device to be matched with and in contact with the lance transmission head of the lance. Under an operation of the driving control circuit 2 that pre-stores the signal of the forward rotation, the motor drives the screw of the lance to rotate forwardly to screw the solid sample into the lance. Once the plunger is released and the sample is taken in and weighed, the transmission shaft head retreats into the space inside of the tip portion of the solid transferring device, which avoids the interference caused by contact with the lance transmission head and improves the weighing accuracy of the sample.

Figure 15:
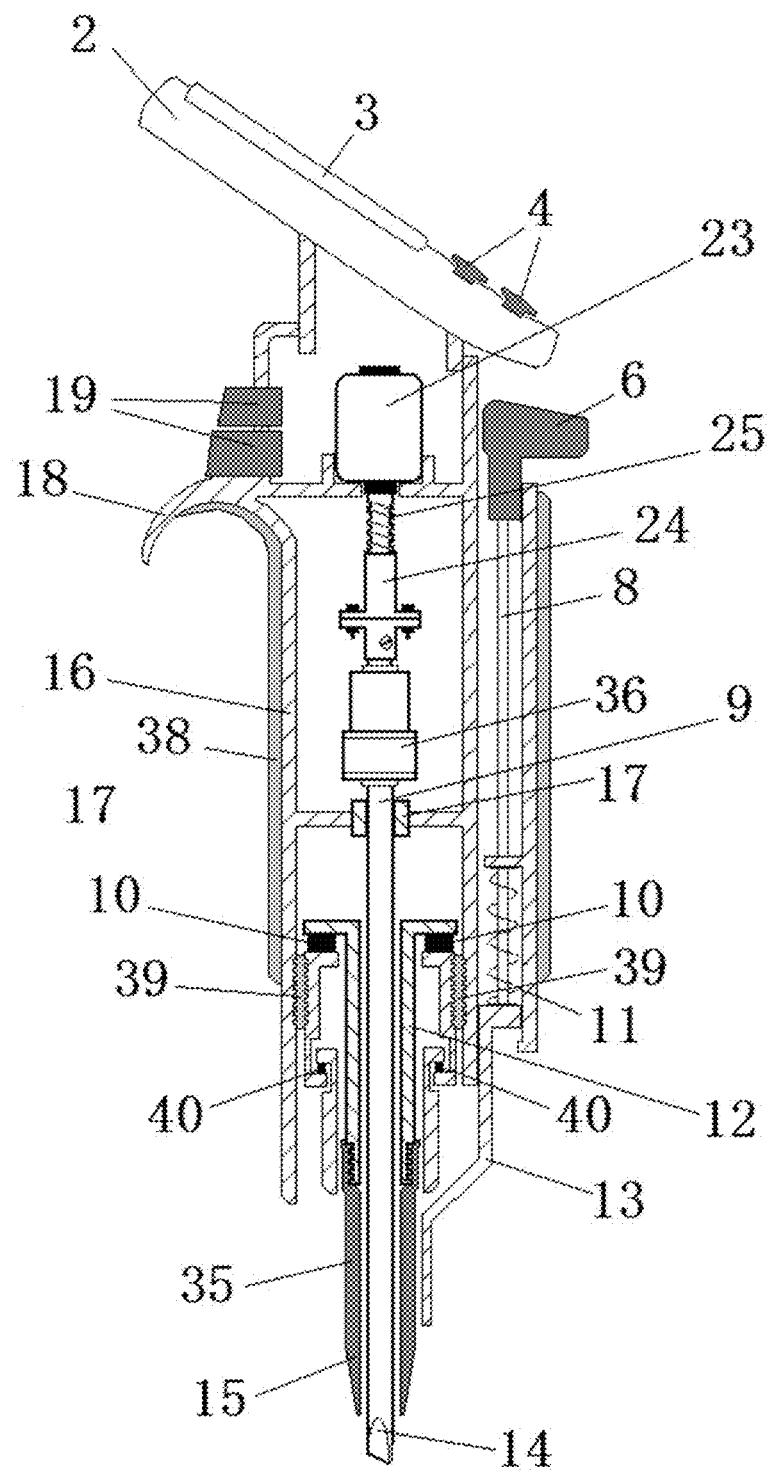
FIG. 15 is a schematic diagram showing a solid transferring device when an electric push rod is extended according to an embodiment of the present disclosure.

As shown in FIG. 12, FIG. 13, or FIG. 15, the solid transferring device with the electric push rod is provided. The driving mechanism includes a speed reduction motor 36 and an electric push rod mechanism composed of an electric push rod 24, a lead screw 25 and a push rod motor 23. The push rod motor is downwardly mounted in the casing 16. A mounting portion of the speed reduction motor 36 is upwardly and fixedly connected to the electric push rod 24 to move upwards or downwards under driving of the push rod motor 23. An output end of the speed reduction motor 36 is downwardly and fixedly connected to the transmission shaft 9 to drive the transmission shaft 9 to rotate and to drive the transmission shaft 9 to move upwards or downwards under the driving of the push rod motor 23.

Before the solid sample is weighted by the above-mentioned solid transferring device, a weighing reading on the monitor 3 is blank, and the electric push rod is in a retracted state, that is, the transmission shaft head 14 is retracted in a space defined by the sleeve 12 and the tip portion 15 of the solid transferring device, and the transmission shaft head 14 is out of contact with the lance transmission head 20 of the lance, which avoids influence on the blank weighing reading. The forward rotation button 19 of the solid transferring device is pressed to start sampling. Under pre-programmed operations, the electric push rod motor 23 drives the lead screw 25 to rotate forwardly, and the electric push rod 24 pushes out the transmission shaft head 14 to match with the lance transmission head of the lance. Then, the speed reduction motor 36 rotates forwardly to transmit a force to the screw 22 of the lance through the transmission shaft head 14 and the lance transmission head 20. The screw 22 rotates forwardly under the force to screw the solid sample into the lance. The forward rotation button 19 is released at any time, and the speed reduction motor 36 and the screw 22 stop under the pre-programmed operations. The electric push rod motor 23 immediately rotate reversely and drives the transmission shaft head 14 back to the space inside of the tip portion 15 of the solid transferring device, such that the transmission shaft head 14 is out of contact with the lance transmission head 20. By observing the weighing reading on the monitor 3, if a desired weight is not reached, the forward rotation button 19 of the solid transferring device is pressed again to continue the sampling. The above-mentioned operations are repeated several times until the desired weight is reached. Since the transmission shaft head 14 is retracted into the space inside of the tip portion 15 of the solid transferring device during weighing, the interference caused by contact with the lance transmission head 20 is avoided, and the weighing accuracy of the sample is improved.

Under the pre-programmed operations, the electric push rod is generally in the retracted state, and only starts to extend when the forward or reverse rotation button of the solid transferring device is pressed. When the electric push rod is extended, the transmission shaft head is pushed out to be matched with the lance transmission head of the lance to realize the forward or reverse rotation of the screw. Once the forward or reverse rotation button is released and the sample is weighed, the transmission shaft head immediately is retreated into the space inside of the tip portion of the solid transferring device, which avoids the interference caused by contact with the lance transmission head and improves the weighing accuracy of the sample.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial direction", "radial direction" and "circumferential direction" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

The above-mentioned are the preferred embodiments of the present disclosure, all changes made according to the technical solutions of the present disclosure, when the resulting functional effects do not exceed the scope of the technical solutions of the present disclosure, belong to the protection scope of the present disclosure.

What is claimed is:

1. A solid transferring device, comprising a main body and a lance;
   wherein the main body comprises a casing, a power system, a weighing system and a control system configured to control an operation of the solid transferring device;
   wherein the casing is provided with an internal cavity that penetrates through the casing in an up and down direction and is configured to accommodate the power system and the weighing system;
   wherein the power system comprises a driving mechanism and a transmission shaft, the driving mechanism is mounted in the casing and has an output end downwardly connected to the transmission shaft, the transmission shaft has a lower end that emerges from the casing and has a transmission shaft head that is configured to be inserted into a lance transmission head;
   wherein the weighing system comprises a weighing sensor mounted in the casing and a sleeve fitted over an outer periphery of the transmission shaft, an upper end of the sleeve has a flange that presses on the weighing sensor, a lower end of the sleeve emerges from the casing and has a tip portion;
   wherein the lance comprises a lance shell, a screw and the lance transmission head, the lance shell is provided with a lance cavity that penetrates through the lance shell in the up and down direction, an upper part of the lance shell has a matching engaging portion for sheathing the tip portion of the sleeve to allow the main body to engage the lance where the tip portion is inserted into the matching engaging portion, the screw and the lance transmission head are located in the lance cavity;
   wherein a lower part of the lance transmission head is fixedly connected to an upper end of the screw to drive the screw to rotate around a center axis of the lance; an upper part of the lance transmission head has a matching transmission portion; and
   wherein the driving mechanism comprises a motor configured to control the transmission shaft to rotate forwardly or reversely, so that when the transmission shaft head is inserted into the matching transmission portion, the motor drives the screw to rotate forwardly to draw in a solid sample or reversely to release the solid sample.

2. The solid transferring device according to claim 1, wherein the transmission shaft head at the lower end of the transmission shaft has a convex structure having a shape selected from a line, a cross, a triangle, a pentagon and a plum blossom; and
   wherein the matching transmission portion on the lance transmission head has a second concave-convex concave structure corresponding to the first convex-concave convex structure.

3. The solid transferring device according to claim 1, wherein the main body further comprises a material-withdrawn vibration device mounted in the casing to act on the transmission shaft and configured to vibrate the transmission shaft when a material is withdrawn;
   the material-withdrawn vibration device comprises a flexible shaft sleeve, a micro vibration motor and a vibration-absorbing spring;
   the flexible shaft sleeve is fitted over the transmission shaft, and mounted in the casing through the vibration-absorbing spring;
   the micro vibration motor is connected to the flexible shaft sleeve to drive the transmission shaft to vibrate through the flexible shaft sleeve;
   the micro vibration motor is mounted in the casing through the vibration-absorbing spring; and
   when the transmission shaft vibrates, the lance is driven by the transmission shaft to vibrate.

4. The solid transferring device according to claim 1, wherein the sleeve comprises an upper sleeve and a lower sleeve that is made of a vibration-absorbing material;
   a lower part of the upper sleeve is engaged to an upper part of the lower sleeve;
   an upper end of the upper sleeve has a flange that presses on the weighing sensor; and
   a lower end of the lower sleeve emerges from the casing and has the tip portion.

5. The solid transferring device according to claim 1, wherein the control system is disposed on an upper part of the casing, and comprises a controller, a display module, a control button, a driving module and a power module;
   the display module is configured to display weighing information and control information;
   the control button is configured to input a control command;
   the driving module is electrically connected to the driving mechanism to control the driving mechanism to operate; and
   the controller is electrically connected to each of the weighing sensor, the display module, the control button, the driving module and the power module.

6. The solid transferring device according to claim 1, wherein the driving mechanism comprises the motor and a coupling, the motor is mounted in the casing, and the coupling has an upper end fixedly connected to an output end of the motor and a lower end fixedly connected to the transmission shaft.

7. The solid transferring device according to claim 1, wherein the driving mechanism comprises the motor and an electric push rod mechanism composed of an electric push rod and a push rod motor; the push rod motor is downwardly mounted in the casing; the electric push rod has an upper end connected to the push rod motor and a lower end connected to the motor; a mounting portion of the motor is upwardly and fixedly connected to the electric push rod to move upwards or downwards under driving of the push rod motor, and an output end of the motor is downwardly and fixedly connected to the transmission shaft to drive the transmission shaft to rotate and to drive the transmission shaft to move upwards or downwards under the driving of the push rod motor.

8. The solid transferring device according to claim 1, wherein the driving mechanism comprises the motor, a plunger, a plunger connecting rod, a plunger return spring and two positioning sensors that operate together with each other; the plunger is located on the upper part of the casing and is configured to move upwards or downwards along the casing, the plunger is downwardly and fixedly connected to an upper end of the plunger connecting rod; a mounting portion of the motor is upwardly and fixedly connected to a lower end of the plunger connecting rod to move downwards under driving of the plunger, and an output end of the motor is downwardly and fixedly connected to the transmission shaft to drive the transmission shaft to rotate; the plunger return spring is mounted between the motor and the casing, and is used to drive the plunger to return its original location after releasing the plunger; the two positioning sensors are each mounted in the casing and on the plunger connecting rod and electrically connected to a controller, wherein a control command is sent to the controller when the two positioning sensors approach to each other; the control command is configured to control the motor to rotate forwardly to drive the screw in the lance to rotate forwardly through the transmission shaft, to draw in the solid sample.

9. The solid transferring device according to claim 1, wherein the motor is a speed reduction motor.

10. The solid transferring device according to claim 1, wherein a shaft sleeve is fitted over the transmission shaft, and the casing provides a connector from a wall of the casing to the shaft sleeve.

11. The solid transferring device according to claim 1, wherein a foamed vibration-absorbing layer is fitted over an outer side of the casing.

12. The solid transferring device according to claim 1, wherein a support portion is disposed on an outer side of the casing, and configured to hang the solid transferring device on other objects.

13. The solid transferring device according to claim 1, wherein the casing is provided with an ejector mechanism;
the ejector mechanism comprises a mounting support, a pressing portion, an intermediate linking rod, an ejector rod and an ejector return spring;
the mounting support is connected to a side of the casing;
the intermediate linking rod is mounted on the mounting support and is slidable along the mounting support upwards or downwards;
the pressing portion is connected to an upper end of the intermediate linking rod and configured to press the intermediate linking rod to move downwards;
an upper end of the ejector rod is fixedly connected to a lower end of the intermediate linking rod, and a lower end of the ejector rod extends along a side of a lower end of the sleeve that emerges from the casing, and the ejector rod is configured to push the lance shell downwards under driving of the intermediate linking rod to push the lance out of the main body of the solid transferring device; and
the ejector return spring is mounted between the ejector rod and the mounting support, and is configured to drive the ejector rod to return its original location.

14. The solid transferring device according to claim 13, wherein the main body further comprises a material-withdrawn vibration device mounted on the casing to act on the sleeve and configured to vibrate the sleeve when a material is withdrawn;
the material-withdrawn vibration device comprises a micro vibration motor that is mounted on the lower end of the ejector rod and extends along the side of the lower end of the sleeve emerging from the casing; and
the micro vibration motor is configured to drive the lower end of the ejector rod to vibrate during operation where the lower end of the ejector rod vibrates to touch and vibrate the sleeve and to further vibrate the lance.

15. The solid transferring device according to claim 1, wherein the weighing system is an anti-interference weighing system comprising a weighing sensor, a vibration sensor, a sensor mounting seat, the sleeve and a vibration isolation connector;
the weighing sensor is mounted on the sensor mounting seat;
the sleeve is fitted over the outer periphery of the transmission shaft;
the lower end of the sleeve emerges from the casing and has the tip portion, and the upper end of the sleeve has the flange that presses on the weighing sensor to detect a bearing weight of the sleeve through the weighing sensor;
the vibration sensor is mounted on the sensor mounting seat, and configured to synchronously sense a vibration interference to the weighing sensor, and compensate for weighing data of the weighing sensor according to a compensation algorithm; and
the sensor mounting seat is connected to the casing through the vibration isolation connector.

16. The solid transferring device according to claim 15, wherein the control system is configured to compensate for the weighing data of the weighing sensor according to the compensation algorithm.

17. The solid transferring device according to claim 16, wherein the control system is configured to:
obtain the weighing data by the weighing sensor and synchronously sensing vibration data by the vibration sensor, and
perform an anti-interference calibration by synchronously compensating for the weighing data with the obtained vibration data to obtain calibrated weighing data.

18. The solid transferring device according to claim 16, wherein the control system is configured to:
establish a vibration filter model,
obtain a trained adaptive filter model by training the vibration filter model using a training data set, and perform anti-interference filtering by inputting the weighing data obtained by the weighing sensor into the adaptive filter model to obtain calibrated weighing data.

19. The solid transferring device according to claim 18, wherein the training data set comprises a plurality of training data items, each training data item comprises a true weight value of a solid sample, weighing data obtained by the weighting sensor and vibration data obtained by the vibration sensor.

* * * * *